Sept. 6, 1949.   R. B. GREENE   2,480,919
RECOVERY OF STYRENE BY AZEOTROPIC DISTILLATION
Filed March 13, 1946
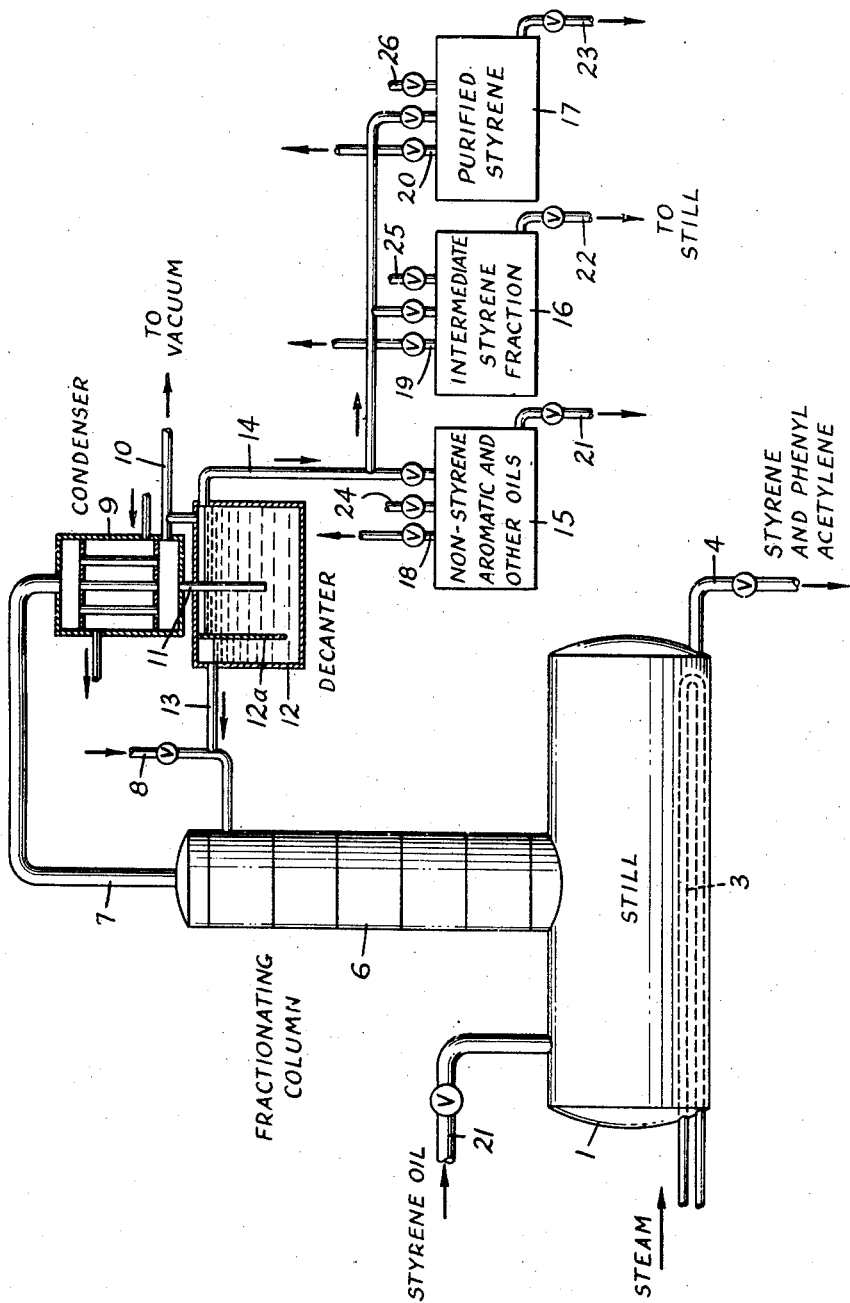
INVENTOR.
RICHARD B. GREENE
BY
George B Campbell
ATTORNEY.

Patented Sept. 6, 1949

2,480,919

UNITED STATES PATENT OFFICE 2,480,919

RECOVERY OF STYRENE BY AZEOTROPIC DISTILLATION

Richard B. Greene, Cheltenham Township, Montgomery County, Pa., assignor to Allied Chemical & Dye Corporation, New York, N. Y., a corporation of New York Application March 13, 1946, Serial No. 654,209

11 Claims. (Cl. 202—42)

This invention relates to the production of substantially pure styrene or a hydrocarbon oil of high styrene content from hydrocarbon oils of relatively low styrene content.

Styrene is found in low concentration in hydrocarbon oils, particularly aromatic hydrocarbon oils, produced in such operations as coal distillation, gas production, and petroleum cracking and reforming. An aromatic hydrocarbon oil containing varying proportions of styrene in admixture with other aromatic hydrocarbons is also obtained when styrene is produced synthetically, e. g. by cracking or dehydrogenation of alkyl benzenes. From these hydrocarbon oils, styrene cuts may be obtained by fractional distillation, which cuts may contain as much as 70% styrene, the remainder consisting of like-boiling aromatic hydrocarbons such as the xylenes and ethylbenzene, and sometimes also aliphatic and naphthenic hydrocarbons boiling close to styrene.

As above indicated, styrene cannot be readily separated from the close-boiling hydrocarbons with which it is generally associated by ordinary fractional distillation. It has been proposed heretofore to recover substantially pure styrene by bringing about polymerization of the styrene in the styrene oil, separating the non-styrene components from the polymerized styrene by distillation, and then cracking the polystyrene by application of heat, whereupon a substantial part of the polystyrene depolymerizes to form monomeric styrene. As this process has generally been carried out in the published prior art, the yield of monomeric styrene has been low, and a styrene product is produced in which the styrene is still admixed with close-boiling hydrocarbons.

It is an object of this invention to provide a process for separating styrene in good yield from the oils in which it occurs, by distillation methods.

It is a further object of this invention to provide a process in which substantially pure styrene may be obtained in a single distillation operation from the usual styrene fractions which may contain, for example, about 50 weight per cent styrene, obtained by fractional distillation of styrene-containing oils produced in coke oven operations, water-gas and oil-gas production, the cracking and reforming of petroleum oils, and styrene synthesis.

I have discovered that substantially pure styrene or a hydrocarbon oil greatly enriched in styrene may be separated from a styrene oil containing styrene, along with aromatic hydrocarbons not readily separable from styrene by ordinary fractional distillation, by carrying out fractional distillation of a mixture of such a styrene oil and an azeotropic agent of the group consisting of methyl glycolate (methyl hydroxyacetate) and alkyl lactates in which the alkyl group contains not more than two carbon atoms, i. e. methyl or ethyl lactate. Methyl lactate, ethyl lactate and methyl glycolate, I have found, on addition to such a hydrocarbon mixture form azeotropes of the minimum-boiling type with the various hydrocarbon constituents of the oil; i. e. hydrocarbon-lactate and hydrocarbon-glycolate mixtures are distilled over at temperatures lower than the distillation temperatures of the individual constituents of such mixtures. The lactates, particularly methyl lactate, are the preferred agents. The styrene oil fraction subjected to azeotropic distillation may have a boiling range from 130° to 150° C. at a pressure of 760 mm. of mercury.

Moreover, I have made the surprising discovery that these lactate and glycolate azeotropic agents form with the non-styrene hydrocarbons, except phenylacetylene, of about the same boiling point as styrene contained in the styrene oil, azeotropic mixtures having substantially lower distillation temperatures than the azeotropic mixtures of these agents and styrene. The agents form with phenylacetylene azeotropic mixtures having higher distillation temperatures than the agents with styrene. Hence, upon fractional distillation of mixtures of the agents with styrene oils, the non-styrene components of the oil, other than phenylacetylene, are distilled off first, the styrene is distilled off next, and, if phenylacetylene is present, it is distilled off last. Thus, in accordance with the invention, material whose hydrocarbon component consists of substantially pure styrene or highly enriched styrene may be left as still residue or recovered as distillate fraction.

Examples of styrene-containing oils which, as above indicated, may be obtained by fractional distillation of the light aromatic hydrocarbon oils recovered in gas production, coke oven operation, petroleum cracking and reforming, styrene synthesis, or similar operations involving synthesis or pyrolysis of aromatic hydrocarbons containing aliphatic substituents include: (1) drip oil, the oil which settles out from carburetted water-gas or oil-gas mains; (2) the light oils recovered by scrubbing of coke oven gas, carburetted water gas and oil gas; (3) the lower boiling fractions distilled from coal tar, carburetted water-gas and oil-gas tar; (4) cracked and reformed petroleum oils; (5) the products of styrene synthesis involving, for example, the pyrolysis of alkyl benzenes; and (6) the products of similar processes involving the synthesis or pyrolysis of aromatic hydrocarbons containing aliphatic substituents, e. g. the product of pyrolysis of a polystyrene resin. From such styrene-containing materials, upon fractional distillation, close-cut fractions boiling, for example, through the range of 140°–146° C. at 760 mm. of mercury pressure, may generally be obtained.

From the first four sources named above, for example, styrene fractions containing up to about 50% styrene by weight are generally obtained; from the other two sources, styrene fractions of higher styrene content may be obtained upon fractional distillation of the original styrene-containing material. Such fractions generally contain varying proportions of styrene, phenylacetylene usually in amount exceeding .05% by weight, substantial proportions of other aromatic hydrocarbons having boiling points close to that of styrene, for example, xylenes, ethylbenzene and other alkyl benzenes, and aliphatic (including naphthenic) hydrocarbons boiling in the neighborhood of the boiling point of styrene.

The term "like-boiling" compounds, with reference to styrene, as used herein, refers to those non-styrene hydrocarbons such as xylenes and ethylbenzene, generally associated with styrene in styrene fractions and to other compounds present in styrene oils which, upon fractional distillation of the oils, tend to distill with the styrene. Styrene fractions produced as above described are, in general, suitable for distillation with the azeotropic agents hereinabove set forth, in accordance with my invention, to produce substantially pure styrene or a hydrocarbon oil greatly enriched in styrene.

In practicing my invention, I have generally found it advantageous to subject a crude styrene oil which is to be processed for recovery of a styrene concentrate to purification, either before or after the azeotropic distillation of my invention. For example, such purification may, particularly in the case of styrene oils recovered from drip oils, light oils, and tar distillates, consist of washing with sulfuric acid followed by neutralization and distillation, and may advantageously follow azeotropic distillation for separation of a styrene concentrate. Other methods of purifying styrene oils are known in the art. Purification operations may also be carried out either prior to or following the above-described initial fractionation to produce a close-cut styrene fraction.

The azeotropic fractional distillation of a styrene oil to which methyl or ethyl lactate or methyl glycolate has been added as azeotropic agent may be carried out as a simple batch or continuous distillation in which the entire amount of agent needed may be added to the styrene oil before fractional distillation. Alternatively, the agent may be added gradually in continuous or intermittent fashion during the course of the fractionation. In the latter case, the agent may be recovered from the distillate during fractionation, as described below, and returned to the still continuously or intermittently; an amount of agent may thus be employed in the process substantially less than the total amount supplied to the still during distillation. One method of bringing about continuous recovery of agent from the distillate during fractionation and its return to the still is to have water present in the upper part of the fractionating column, as more fully described below. The water may be looked upon as an auxiliary azeotropic agent in this case.

The amount of agent added to the styrene oil to be subjected to azeotropic distillation should be regulated so that there will not be an undue amount remaining in the still residue when fractional distillation is discontinued. However, there should be enough agent present so that the azeotropic ratio of agent to hydrocarbon in the vapor within the still and fractionating column will be maintained at least while primarily non-styrene hydrocarbons are being distilled over. Thus, in the case of methyl lactate added to a styrene-xylene oil (e. g. a drip oil fraction), I have found the volume ratio of xylene to methyl lactate to be roughly 7 to 3 in the azeotropic mixture of xylene and methyl lactate that distills over. In the case of ethyl lactate, I have found the volume ratio of xylene to ethyl lactate to be approximately 4 to 1 in the distillate. Accordingly, when using methyl lactate as an azeotropic agent in the distillation of a styrene-xylene oil such as a styrene fraction from drip oil, I have found it desirable to provide, during the distillation, a total volume of methyl lactate equal to at least three-sevenths of the volume of xylenes present in the styrene oil; similarly, with ethyl lactate, I have found it desirable to provide a total volume equal to at least one-fourth of the volume of xylenes. In the azeotropic distillation of other styrene oils, e. g. styrene-ethylbenzene oils, the ratios of non-styrene hydrocarbon to agent in the azeotropic mixture may vary somewhat from those given above for xylene, e. g. may be up to 25% higher or lower; the azeotropic ratio for any hydrocarbon and agent mixture may readily be determined by a test distillation, and the minimum quantity of agent added to the styrene oil may be governed accordingly.

As above stated, the azeotropic distillation of the styrene oil to which agent has been added may be carried out either batchwise or continuously with or without water as an auxiliary agent. In a batchwise fractionation not employing water as auxiliary agent the distillate at first consists almost entirely of the azeotropic mixture of methyl or ethyl lactate or methyl glycolate and non-styrene oil, but as fractionation proceeds and the temperature approaches the distillation temperature of the agent-styrene azeotrope, the styrene content of the distillate gradually increases. The course of the fractionation may be followed by taking samples of the distillate and testing them for their styrene content. When the distillate tests sufficiently high in styrene, the styrene product may then either be withdrawn from the still or taken as final distillate fraction.

In continuous operation the styrene-oil and azeotropic agent may be continuously introduced into an intermediate portion of the fractionating column. A product whose oil component is substantially pure styrene or a greatly enriched styrene oil may be continuously withdrawn from the still and an azeotropic mixture of non-styrene hydrocarbon and agent may be continuously taken off overhead. This distillate may be condensed, the agent separated as described below, and the separated agent returned to the fractionating column along with the entering styrene oil.

In batchwise distillation employing water as auxiliary agent, a charge of styrene oil, primary agent (methyl lactate or glycolate or ethyl lactate) and water is placed in the still and subjected to fractional distillation. The water, the most volatile component of the mixture, is generally substantially completely volatilized from the still charge and is eventually found in substantial proportions only in the upper part of the fractionating column and in the distillate. As the distillate is condensed it stratifies into a water layer and hydrocarbon oil layer. The water layer, which contains in solution most of the agent coming over in the distillate, is continuously returned to the top of the column. In the upper part of the column, therefore, this aqueous liquid along with some condensed hydrocarbon flows downwardly countercurrent to vapors of water, hydrocarbon, and agent passing upwardly through the column. This water present in the upper part of the column subjects the oil-agent mixture to steam distillation whereby the non-water-soluble hydrocarbon is vaporized preferentially to the water-soluble agent, and the vapor mixture which passes over as distillate from the head of the column accordingly consists of water and hydrocarbon vapors admixed with a substantially smaller amount of agent than comes over in the distillate when water is not employed as auxiliary agent. As above indicated, the agent that does come over in the distillate appears largely in the water layer upon stratification of the distillate and is therefore returned to the still. The primary azeotropic agent is thus substantially completely retained in the still system, largely distributed throughout the fractionating column. The water, because of its volatility, is not found in substantial amounts below about the upper fifth of the column. As in the batchwise distillation above described, distillation is continued until a styrene product of desired purity is obtained either as still residue or as final distillate fraction.

The distillation employing water as auxiliary azeotropic agent may also be carried out continuously by continuously introducing a mixture of the styrene oil and, if necessary, primary azeotropic agent into an intermediate portion of the fractionating column of a still and column system wherein a mixture of styrene oil, primary agent and water is being fractionated; water for the fractionation is introduced continuously or intermittently into the top of the column. As in the batchwise procedure above described, all or a greater part of both the water and agent needed for fractionation may be provided by continuous return of the water component of the condensed distillate to the top of the fractionating column.

While batch distilling an oil containing phenylacetylene, the distillation may be carried out as above described taking off as distillate, first, the non-styrene hydrocarbons other than phenylacetylene as an azeotropic mixture with the agent, then an azeotropic mixture of styrene with the agent, leaving as still residue an oil containing a mixture of phenylacetylene and a portion of styrent. This residue may be subjected to further azeotropic distillation, as hereinabove described, to separate styrene from the phenylacetylene. When distilling a styrene oil in a continuous manner, the non-styrene oils may be taken off as overhead azeotropic distillate, styrene substantially free from phenylacetylene may be withdrawn from an intermediate portion of the fractionating column, and a residue containing most or substantially all of the phenylacetylene withdrawn as bottom product from the column.

The degree of fractionation (determined by the number of plates employed in the fractionating column, the point at which batchwise fractionation is discontinued and the styrene content of the hydrocarbon oil being treated) is controlled so as to give a final product of desired styrene content. I have found it advantageous, when subjecting a close-cut styrene fraction to azeotropic distillation as herein described, to continue fractionation until the fraction being taken or the material remaining in the still has at least an 85% styrene content (by weight) based on the oil component of the material. By more exhaustive fractionation or refractionation of a styrene-enriched oil, styrene concentrations of 98%–100% may be obtained.

I have found it advantageous to carry out the distillation at reduced pressures, i. e. at a pressure not above about 110 mm. mercury, absolute, since it is desirable to maintain a relatively low temperature in the system so as to avoid excessive polymerization of the styrene in the still. As an added precaution, polymerization inhibitors such as hydroquinone or phenylhydrazine, or more advantageously hematoxylin, may be added to the material in the still. The distillation may then advantageously be carried out at temperatures up to about 95° to 100° C.

In the process of my invention the various oil fractions that contain methyl or ethyl lactate or methyl glycolate obtained as azeotropic mixtures in the above-described azeotropic distillation are treated to separate the agent from the oil. This may be conveniently done by washing with water to dissolve out the agent. A non-styrene hydrocarbon oil useful for solvent purposes may thus be recovered from the more volatile distillate fractions produced in the above azeotropic distillation, and substantially pure styrene or a greatly enriched styrene fraction may be recovered from the material which is either withdrawn from the still or distilled over as the last distillate fraction, as above described. When only a limited amount of agent has been used, as above pointed out, there may be little or no agent remaining in the styrene product, and in some cases, therefore, it may be unnecessary to wash the styrene product for removal of agent. The water solution of agent obtained in the washing operations may be subjected to a straight fractional distillation, or, preferably, may be azeotropically distilled with benzene, for separation of the agent, and the agent thus recovered may be reused in the process.

Alternatively, the agent may advantageously be recovered from the hydrocarbon oils in which it is dissolved by an azeotropic distillation of the agent-hydrocarbon solution with water as the azeotropic agent. This may be carried out by charging the agent-hydrocarbon solution to the still with a relatively small proportion of water and subjecting the mixture to fractional distillation. The early distillate consists of azeotropic mixtures of hydrocarbon and water substantially free of agent or azeotropic mixtures of hydrocarbon, water and relatively small proportions of agent. This distillate is condensed, whereupon it stratifies into two layers. The lower aqueous layer is continuously returned to the column, whereas the upper hydrocarbon layer is returned only in part to maintain column equilibrium, the remainder being withdrawn. This is continued until nearly all hydrocarbon has been removed from the still charge. When such a point has been reached, distillation is continued as before, but the water layer is now withdrawn while the small quantity of hydrocarbon layer is returned to the still. This is continued until the water has been removed. At this point, the still residue consists of practically pure agent with only a small quantity of hydrocarbon admixed therewith. This residue may be reused directly or it may be subjected to a straight distillation to obtain a colorless product, and this product may then be employed as primary agent in subsequent azeotropic distillations for separation of styrene.

The styrene product may advantageously be subjected to purification treatment, such as the sulfuric acid wash above described, and upon straight distillation a water-white monomeric styrene product of 98%–100% purity may thus be obtained.

An apparatus suitable for carrying out the process of the invention is illustrated in the accompanying drawing. With particular reference to this drawing, still 1, having oil inlet 2, steam heating coil 3, and distillation residue outlet 4, is provided with a fractionating column 6 of conventional bubble tray type with vapor outlet 7 and liquid inlet 8 at the top. Vapor outlet 7 leads to condenser 9 from which a gas conduit 10 leads to suitable pressure reducing means (not shown) and liquid outlet 11 leads to decanter 12 from which pipe 13 connects with inlet 8 and pipe 14 passes to receivers 15, 16 and 17. These receivers may be connected to evacuating means (not shown) by pipes 18, 19, and 20. Draw-off outlets 21, 22, and 23, and vents 24, 25, and 26 on receivers 15, 16, and 17 permit removal of their contents.

In operation of this apparatus still 1 is charged via inlet 2 with crude styrene containing like-boiling aromatic hydrocarbon oil contaminants. The still charge is heated to distillation temperature, cooling fluid is passed through condenser 9, vacuum is applied at 10 and 18, appropriate quantities of water and azeotropic agent are introduced at 8, and distillation is effected. Water and non-styrene aromatic azeotrope are condensed in condenser 9 and the condensate is decanted in decanter 12 having partition 12a, water and azeotropic agent being returned through pipe 13 to the still column and non-styrene, aromatic and other oils being collected in receiver 15. When the major portion of non-styrene oil has been distilled over, vacuum is applied to receiver 16 and condensate flow is shunted to this receiver to collect an intermediate styrene condensate fraction. This fraction subsequently may be returned to the still for distillation with another batch of crude styrene. When pure styrene begins to come over, flow is shunted to receiver 17. To collect a product free of phenyl acetylene, distillation is stopped before any of this material distills over. The residue in the still may be removed and either sent to storage to await collection of an amount large enough to provide a charge for the same still or conveyed to a smaller still for separation of residual styrene from phenyl acetylene, or the residue may be permitted to remain for treatment with a subsequent batch of crude styrene.

The following examples are illustrative of the process of my invention:

*Example 1—Methyl lactate agent.*—A close-cut styrene fraction was obtained by fractional distillation of drip oil. The fraction contained 50% styrene and boiled through the approximate range 138° to 146.5° C.

200 parts by volume of the resulting styrene oil were mixed with 300 parts by volume of methyl lactate (an excess of agent over the minimum amount needed for the azeotropic separation), and the mixture subjected to fractional distillation. The distillation was carried out under an average absolute pressure of about 26 mm. mercury and the temperature ranged from about 44° to 52° C. Five distillate fractions of oil-agent azeotropic mixtures were taken through this temperature range, corresponding, when corrected to 760 mm. mercury, to cuts taken at regular intervals through the temperature range 132° to 146° C. The compositions of these fractions are tabulated below:

| Fraction | Oil to Agent Ratio in Fraction (by Volume) | Volume Per cent Yield of Oil Based on Oil Charged | Weight Per Cent Styrene in Oil Component of Fraction |
|---|---|---|---|
| 1 | 2.84:1 | 18.5 | 0 |
| 2 | 2.44:1 | 22 | 4 |
| 3 | 2.12:1 | 17 | 47 |
| 4 | 2.12:1 | 17 | 80 |
| 5 | 1.78:1 | 16 | 95 |

Each fraction was washed with water to remove methyl lactate.

Thus, by a single azeotropic distillation, a substantial yield of 95% styrene was obtained (fraction 5). The fourth fraction may be worked up by further distillation to increase its styrene content, while the third fraction may be added to the next batch of styrene oil to be subjected to azeotropic distillation. In this way a high recovery of the styrene in the close-cut drip oil fraction may be obtained and a product of 95%, or better, styrene content produced.

*Example 2—Ethyl lactate agent.*—200 parts by volume of the same styrene fraction as in Example 1 were mixed with 100 parts by volume of ethyl lactate (an excess of agent over the minimum amount needed for the azeotropic separation), and the mixture subjected to fractional distillation under an average absolute pressure of about 32 mm. mercury. Ten fractions were taken through a temperature range from about 48° to 56° C., corresponding, when corrected to 760 mm. mercury, to cuts taken at regular intervals through the range 137° to 152° C. The compositions of these fractions are tabulated below:

| Fraction | Oil to Agent Ratio in Fraction (by Volume) | Volume Per Cent Yield of Oil Based on Oil Charged | Weight Per Cent Styrene in Oil Component of Fraction |
|---|---|---|---|
| 1 | 5.25:1 | 10.4 | 0 |
| 2 | 5.25:1 | 10.5 | 0 |
| 3 | 5.25:1 | 10.5 | 0 |
| 4 | 5.25:1 | 10.7 | 21 |
| 5 | 4 :1 | 10 | 32 |
| 6 | 11.5 :1 | 11.6 | 52 |
| 7 | 5.25:1 | 10.6 | 63 |
| 8 | 5.25:1 | 10.5 | 74 |
| 9 | 5.25:1 | 10.5 | 88 |
| 10 | 0.41:1 | 3.4 | 85 |

Each of these fractions was washed with water to remove the ethyl lactate.

In this run a substantial yield of 85%–88% styrene was obtained in a single distillation (fractions 9 and 10). By further distillation of fractions 9 and 10, as well as the intermediate fractions 4 to 8 containing from 24%–71% styrene, a high yield of substantially pure styrene may be obtained.

*Example 3—Methyl glycolate agent.*—A close-cut styrene fraction of drip oil of boiling range similar to that utilized in Example 1 was employed. The fraction contained approximately 45.5% of styrene, 32.7% of orthoxylene, 16.4% of meta- and paraxylenes, 2.7% of paraffins and 2.7% of olefins. 275 parts by volume of this fraction were mixed with 300 parts by volume of methyl glycolate and the mixture was subjected to fractional distillation, as described in the preceding examples. The purity of the styrene recovered from this operation was substantially the same as that of the styrene recovered in Example 2.

The above distillations may be carried out in continuous fashion, whereupon a material containing from 85%–100% styrene (based on the oil component of the material), depending upon how exhaustive the fractionation, is continuously withdrawn from the still.

Since certain changes may be made in carrying out the above process without departing from the scope of the invention, it is intended that all matter contained in the above description shall be interpreted as illustrative and not in a limiting sense.

I claim:

1. In a method of producing a hydrocarbon oil of high styrene content from an oil containing a lower styrene content and at least one like-boiling aromatic non-styrene component, the step which comprises fractionally distilling a mixture of such oil and an azeotropic agent of the group consisting of alkyl lactates in which the alkyl group contains not more than two carbon atoms and methyl glycolate at a distillation temperature such that an aromatic component is distilled off in the form of an azeotrope with said agent.

2. A method for increasing the styrene content of an oil containing styrene and at least one like-boiling aromatic hydrocarbon, comprising adding to the oil an azeotropic agent of the group consisting of alkyl lactates in which the alkyl group contains not more than two carbon atoms and methyl glycolate, subjecting this mixture to fractional distillation to separate as distillate an azeotropic mixture consisting predominantly of at least one non-styrene aromatic hydrocarbon and the agent, and recovering from the material from which such azeotropic mixture has been separated an oil having a substantially greater styrene content than the original styrene oil.

3. In a method for increasing the styrene content of an oil containing styrene and at least one like-boiling aromatic hydrocarbon, the step which comprises fractionally distilling a mixture of such oil and an amount of methyl lactate sufficient to form an azeotropic distillate containing at least a part of the non-styrene aromatic hydrocarbon component of the oil.

4. In a method for increasing the styrene content of an oil containing styrene and at least one like-boiling aromatic hydrocarbon, the step which comprises carrying out fractional distillation of a mixture of such oil and an amount of ethyl lactate sufficient to form an azeotropic distillate containing at least a part of the non-styrene aromatic hydrocarbon component of the oil.

5. In a method for increasing the styrene content of an oil essentially consisting of styrene and at least one like-boiling non-styrene aromatic hydrocarbon component, the steps which comprise adding to the oil an alkyl lactate in which the alkyl group contains not more than two carbon atoms, employed in amount sufficient to form an azeotropic distillate containing at least a part of the non-styrene component of the oil, subjecting this mixture to fractional distillation to separate as distillate an azeotropic mixture consisting predominantly of lactate and said non-styrene component and to produce as a second product a material comprising an oil having a substantially greater styrene content than the original oil, and thereafter removing the lactate from the oil fractions in which it is present.

6. In a method for production of relatively pure styrene from an industrial styrene fraction containing, besides styrene, at least one like-boiling non-styrene aromatic hydrocarbon, the steps which comprise carrying out continuous fractional distillation of a mixture of such styrene fraction and an amount of methyl lactate sufficient to form an azeotropic mixture with most of the aromatic hydrocarbon component of the oil, continuously withdrawing as distillate product an azeotropic mixture consisting predominantly of methyl lactate and aromatic hydrocarbon, and continuously withdrawing as residual product a material whose oil component is relatively pure styrene.

7. In a method for production of relatively pure styrene from an industrial styrene fraction containing, besides styrene, at least one like-boiling non-styrene aromatic hydrocarbon, the steps which comprise carrying out continuous fractional distillation of a mixture of such styrene fraction and an amount of ethyl lactate sufficient to form an azeotropic mixture with most of the non-styrene aromatic hydrocarbon component of the oil, continuously withdrawing as distillate product an azeotropic mixture consisting predominantly of ethyl lactate and non-styrene aromatic hydrocarbon material, and continuously withdrawing as residual product a material whose oil component is relatively pure styrene.

8. In a method for increasing the styrene content of an oil essentially consisting of styrene and at least one like-boiling non-styrene aromatic hydrocarbon, the steps which comprise adding to the oil water and an azeotropic agent of the group consisting of alkyl lactates in which the alkyl group contains not more than two carbon atoms and methyl glycolate, said agent being employed in amount sufficient to form an azeotropic mixture with at least a part of the non-styrene aromatic hydrocarbon, subjecting this mixture to fractional distillation to take off as distillate an azeotropic mixture consisting predominantly of water and non-styrene aromatic hydrocarbon, introducing water into the upper part of the fractionating column, continuing fractional distillation and introduction of water into the column until the greater part of the non-styrene hydrocarbons has been separated from the styrene oil, and thereafter withdrawing as product a styrene oil richer in styrene than the original oil.

9. In a method for increasing the styrene content of an oil essentially consisting of styrene and like-boiling non-styrene aromatic hydrocarbon components, the step which comprises carrying out fractional distillation of a mixture of such oil and an azeotropic agent of the group consisting of alkyl lactates in which the alkyl group contains not more than two carbon atoms and methyl glycolate, said agent being employed in amount sufficient to form an azeotropic distillate containing at least a part of the non-styrene aromatic hydrocarbon component of the oil, said fractional distillation being carried out in the presence of a styrene polymerization inhibitor and at a temperature not more than about 100° C.

10. In a method for increasing the styrene content of an oil essentially consisting of styrene and like-boiling non-styrene aromatic hydrocarbons including phenylacetylene, the steps which comprise adding an agent of the group consisting of methyl lactate, ethyl lactate and methyl glycolate to the oil, subjecting this mixture to fractional distillation, adding water to the upper portion of the fractionating column, whereby a mixture consisting predominantly of water and non-styrene aromatic hydrocarbon other than phenylacetylene is removed as overhead distillate from the column, stratifying the distillate into water and hydrocarbon layers and returning the water to the upper part of the fractionating column, and continuing fractional distillation, stratification of the distillate, and return of water to the upper part of the column until the greater part of the non-styrene aromatic hydrocarbon other than phenylacetylene has been separated from the styrene oil continuing the distillation as aforesaid to distill styrene free from phenyl acetylene, condensing the styrene and collecting it apart from the non-styrene aromatic hydrocarbon distillate.

11. In a method for substantially removing phenylacetylene from a styrene oil containing it, the step that comprises fractionally distilling a mixture of such oil and an azeotropic agent of the group consisting of methyl lactate, ethyl lactate and methyl glycolate at a distillation temperature such that the styrene is distilled off in the form of an azeotrope with said agent, whereby the phenyl acetylene is concentrated in the distillation residue.

RICHARD B. GREENE.

REFERENCES CITED

The following references are of record in the file of this patent:

UNITED STATES PATENTS

| Number | Name | Date |
| --- | --- | --- |
| 2,308,229 | Natta | Jan. 12, 1943 |
| 2,376,870 | Engel | May 29, 1945 |
| 2,381,996 | Bloomer | Aug. 14, 1945 |
| 2,419,521 | Waldron | Apr. 22, 1945 |

Certificate of Correction

Patent No. 2,480,919                                 September 6, 1949

RICHARD B. GREENE

It is hereby certified that errors appear in the printed specification of the above numbered patent requiring correction as follows:

Column 5, lines 61 and 62, for "styrent" read *styrene*; column 7, line 49, for the word "receive" read *receiver*; column 10, lines 18 and 21, before "aromatic", each occurrence, insert *non-styrene*;

and that the said Letters Patent should be read with these corrections therein that the same may conform to the record of the case in the Patent Office.

Signed and sealed this 31st day of January, A. D. 1950.

[SEAL]

THOMAS F. MURPHY,
*Assistant Commissioner of Patents.*